Oct. 13, 1970  F. OSTER  3,533,742
PRODUCTION OF TITANIUM DIOXIDE
Filed July 3, 1968
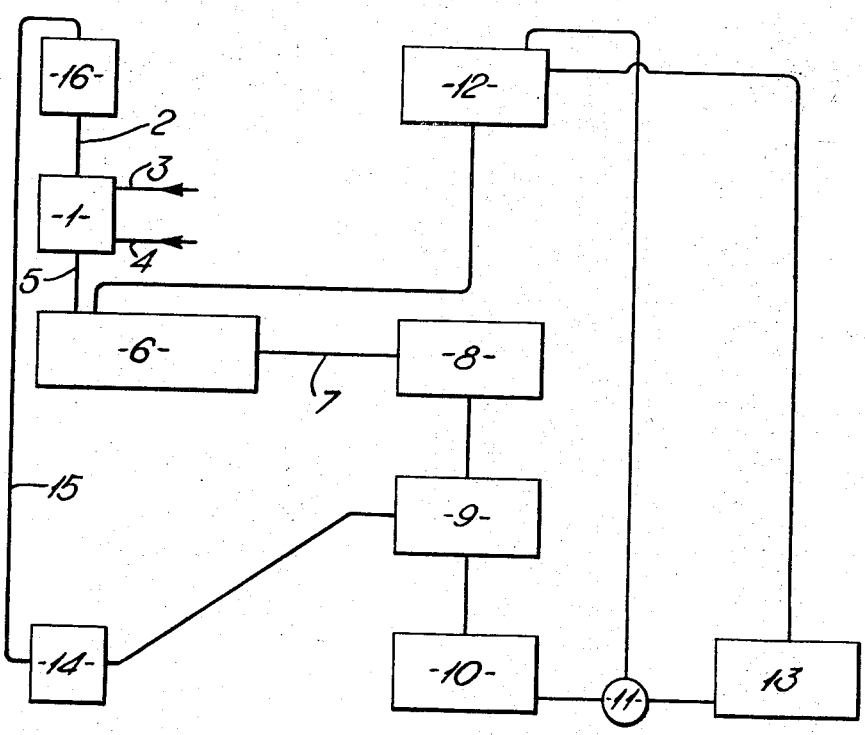

United States Patent Office 3,533,742
Patented Oct. 13, 1970

1

3,533,742
PRODUCTION OF TITANIUM DIOXIDE
Felix Oster, Strasbourg, France, assignor to Fabriques de Produits Chimiques de Thann et de Mulhouse, Thann, Haut-Rhin, France, a corporation of France
Filed July 3, 1968, Ser. No. 742,407
Claims priority, application France, July 7, 1967, 1,845
Int. Cl. C01g 23/06
U.S. Cl. 23—202     13 Claims

ABSTRACT OF THE DISCLOSURE

In the production of titanium dioxide by forming titanium sulphate by the action of sulphuric acid on an iron-containing titanium ore and subsequent hydrolysis of the titanium sulphate in solution, the dilute sulphuric acid obtained from the hydrolysis is concentrated to about 60% in a single step and recycled without removing residual iron and titanium sulphates. Before being reused it is mixed with fresh make-up acid and also acid obtained from the effluent from the treatment of the ore by crystallising out and filtering off the sulphates formed, which are then re-dissolved, and the solution treated to remove iron as ferrous sulphate heptahydrate before being passed to the hydrolysis.

---

This invention relates to a cyclic process for the production of titanium dioxide from titanium ores by the sulphate process involving the simultaneous recovery from the hydrolysis mother liquors of the sulphuric acid for re-use and of the titanium dioxide and to apparatus for use therein.

The recovery of the sulphuric acid from such mother liquors has been the object of numerous processes, and although these processes suffer from hitherto unavoidable technical and economic disadvantages, they are important in view of the increasingly severe requirements in respect of the avoidance of water pollution, in this case either by acids or by oxygen acceptors such as ferrous compounds.

One difficulty of the prior recovery treatments has been to separate the acid from the solid sulphates (principally $FeSO_4 \cdot H_2O$) formed during the concentration of the hydrolysis mother liquors. These sulphates precipitate in a form which is difficult to filter or to dry, and which retains large amounts of impregnating acid, which causes losses both of acid and of titanium dioxide.

The conversion of these sulphates to a granular state in which they are easy to filter off is thus one of the principle problems which has to be solved.

An industrially valid process presupposes furthermore that the recovered acid should be in a form which can be used in the digestion of further ore, and that as far as possible a cycle should be set up comprising the digestion, the hydrolysis to titanium dioxide, and the return of the acid from the hydrolysis to the digestion. Furthermore it is necessary that the expenditure of energy and work involved should be consistant with an optimum yield in the process as a whole. Such a cyclic process has however hitherto not been achieved, principally because of the above-mentioned difficulties which are encountered when the sulphuric acid is recovered from the hydrolysis mother liquors.

2

The standard method for carrying out this recovery consists of concentrating the mother liquor, after the precipitation, in two stages until it corresponds to a sulphuric acid of concentration at least 90%, which can be re-used in the digestion of the titanium ore. When this is done, the iron which it contains separates as ferrous sulphate monohydrate at the end of the first evaporation stage, that is to say at about 60% $H_2SO_4$, in an amount which can exceed the 30% of iron introduced with the titanium ore.

The ferrous sulphate monohydrate which separates out is of extremely fine particle size, especially when using an immersion boiler concentrator such as are popular today, in which this sulphate is precipitated continuously in a non-crystalline form and is broken up by the stream of combustion gases from the boilers. It is consequently extremely difficult, if not in practice impossible, to separate this sulphate from the acid which goes forward to the second concentration stage.

To avoid blockage of filters, by precipitating the sulphates as coarse particles which can be easily separated, various proposals have been made, all of which however require special apparatus (filters, vacuum driers, decanters etc.) for extracting the iron sulphate, as well as special installations for the hydrolysis of the titanium sulphate remaining in the mother liquor, and the recovery of the resulting titanium dioxide, so greatly increasing the capital needed.

Our German patent specification No. 886,142 describes the recovery of the sulphuric acid from the hydrolysis mother liquors by a two-stage concentration in which the iron sulphate monohydrate is recovered as large crystals. A more recent process for doing the same thing is described in our German patent specification DAS 1,132,401.

Attempts have also been made to obtain the iron sulphate monohydrate in large easily filterable crystals by means of a controlled crystallisation. Thus, according to DAS 1,119,835 the excessively fine crystals responsible for the formation of sulphate broths which cannot be filtered are dissolved by adding, to the concentrate which is saturated with ferrous sulphate, acid which has already been concentrated and is clear, that is to say which has been freed of its content of solid salt. The procedure described in French patent specification No. 874,677, which consists of returning clear acid which has already been concentrated to the mother liquors being evaporated does not cause anything else (other than the fluidisation of the suspension of $FeSO_4 \cdot H_2O$) than the simultaneous dissolution of the excessively small seed crystals which cause the separation of an excessively fine iron sulphate. In each case the economics of the process are significantly worsened as a result of intermediate filtrations or other similar complications. This disadvantage is also present in another process for digesting titanium ores proposed in German patent specification No. 1,003,958, in which some residual acid from the hydrolysis, after concentration by evaporation, is incorporated in the mixture used for the digestion.

An object of the present invention is to overcome the above-mentioned disadvantages. To this end there is employed a cyclic process for the production of titanium dioxide from a titanium ore by digesting the ore with sulphuric acid and hydrolysing the titanium sulphate so obtained, which comprises feeding fresh sulphuric acid and the titanium ore to a digestion zone, cooling the solution obtained from the digestion so as to precipitate the sulphates contained in it, separating the precipitate from the acid mother liquor, recycling the said mother liquor to the digestion zone, dissolving the precipitate in water, separating ferrous sulphate heptahydrate from the solution, hydrolysing the titanium sulphate in the solution to titanium dioxide, separating the titanium dioxide from the hydrolysis mother liquor, concentrating the hydrolysis mother liquor in a single stage without removing sulphates therefrom, and recycling the concentrated hydrolysis mother liquor to the digestion, the amount of sulphuric acid employed in the digestion being more than twice the stoichiometric equivalent of the titanium ore.

In a preferred embodiment of the invention the hydrolysis mother liquor is concentrated to a sulphuric acid content of about 60%, a total of 4–6 times, preferably 5.5 times, its weight of sulphuric acid (reckoned as 100%) is added as a 60% solution to the concentrated hydrolysis mother liquor, and the amount of titanium ore treated is such that it contains 2–3, preferably 2.3, parts by weight of iron for each part of iron in the recycled hydrolysis mother liquor. Clearly, the proportions of ore and sulphuric acid added will vary with the variable compositions of titanium ores, being governed by the proportion of iron in the ore.

It will be seen that by operating in this way the iron is removed from the system wholly in the form of ferrous sulphate heptahydrate, which forms relatively large crystals which are easily separated by filtration. Any ferrous sulphate monohydrate which separates out during the concentration of the hydrolysis mother liquor is not removed from the liquor, but redissolved as a result of adding to the mother liquor fresh sulphuric acid, usually of concentration about 60%, or when the resulting acid is heated to the digestion temperature, or in the course of the digestion.

Another important advantage is that any titanium sulphate which remains in the hydrolysis mother liquor is necessarily eventually returned to the hydrolysis operation, so that no supplementary hydrolysis or other operations are needed to ensure its recovery as titanium dioxide.

While it is possible to apply the invention to batch operation, it is a further advantage that it is easily applied to, and indeed is especially suited to, continuous operation.

It is of course basic to the invention that it renders unnecessary the two-stage concentration of the hydrolysis mother liquor and its treatment to remove sulphates therefrom, so reducing the overall cost of the titanium dioxide. Moreover the consumption of sulphuric acid can be reduced by up to, or even more than, a third.

The amount of sulphuric acid employed for the digestion is sufficient to ensure that the digestion mixture is always fluid.

The single stage concentration of the hydrolysis mother liquor may be performed in any suitable device, e.g. an emmersion boiler. As already indicated, no filtration or other ancillary operations are required at this stage.

The concentrated hydrolysis mother liquor, which at this stage contains precipitated ferrous sulphate monohydrate in suspension, is made up by adding fresh and recycled sulphuric acid of similar concentration, namely about 60%, and is heated with vigorous stirring to about 130° C. During this heating the viscosity of the composition decreases as the iron sulphate goes into solution, eventually becoming steady when as much of the iron sulphate as will dissolve at this stage has done so. (Any residue will go into solution during the digestion.) The ore, e.g. ground ilmenite, is then added, and the digestion begun.

Digestion may be continued for 1 hour during which the mixture is stirred vigorously, while the temperature rises to the boiling point, which is close to 150° C. When the digestion is complete the mixture is cooled, preferably to 60° C. or below, e.g. to 50° C., and the whole batch filtered through an acid-resistant fabric. The clear acid filtrate can be passed to a reservoir or storage tank for recycling, and the slightly moist mass of sulphate obtained as residue may be washed with small quantities of water or of mother liquor or with a mixture of the two. The mass of sulphate can then be dissolved in water or in the wash liquor as in the ordinary course of manufacture of titanium dioxide. From the resulting solution iron, derived both directly from the ore and from the recycled hydrolysis mother liquor, is removed by crystallisation as ferrous sulphate heptaydrate, which can be filtered off in a state substantially free from free acid.

The repeated recycling of the acid filtrate, which contains the principal contaminating elements which harm the whiteness of the final titanium dioxide, such as chromium, vanadium, and manganese, causes such elements to build up in the system. It is accordingly advantageous to withdraw a fraction of the acid filtrate either continuously or at intervals, or to discard the whole acid filtrate at intervals, and to replace the withdrawn or discarded acid by fresh sulphuric acid of the required concentration. For example one tenth of the filtrate may be withdrawn continuously, or a corresponding quantity at intervals, or the whole of the filtrate may be discarded after a time corresponding to about 10 cycles of the sulphuric acid.

A ratio of 5.5:1 of the combined fresh and recycled clear sulphuric acid to the sulphuric acid in the concentrated hydrolysis acid mother liquor permits about half, calculated as iron sulphate monohydrate, of the sulphates suspended in the concentrated mother liquor to be redissolved, and provides the best filtration properties of the sulphates as precipitated by cooling. The solubility of ferrous sulphate in 60% sulphuric acid is 1% (as iron) at 130°. Similarly the addition of the specified quantity of ore also favours easy filtration of the sulphates. If less ore is used, more free sulphuric acid will remain in the system than is required for the process as a whole. On the other hand, if the specified quantity of ore exceeded the stability of the titanium sulphate may suffer. The proportions of the various reactants specified above are therefore important for the successful carrying out of the process.

The invention is illustrated in the accompanying drawing, in which the figure shows a plant for continuously carrying out the process, in the form of a flow sheet.

The plant comprises a mixer 1 with inlet lines 2 for concentrated recycled hydrolysis mother liquor 3 for fresh sulphuric acid, and 4 for crushed ilmenite or other titanium ore. A line 5 leads from the mixer to a digester 6, which is preferably of the cascade type though shown in the drawing as a single unit. From the digester a line 7 leads to a cooler 8, in which the liquor from the digester is cooled and at least the major part of the sulphates which it contains is precipitated. The resulting slurry passes to a rotary vacuum filter unit 9, which discharges the clear acid filtrate to a vacuum receiver 10, from which it is fed by a pump 11 to a clear acid reservoir 12. A discharge reservoir 13 is also provided, to which acid which is to be withdrawn can be passed either directly from the pump 11 or from the reservoir 12.

The precipitated sulphates are passed from the filter unit to a hydrolysis plant 14 of a conventional type, in which much of their iron content is removed in the form of ferrous sulphate heptahydrate, and the titanium sulphate is for the most part hydrolysed to titanium dioxide. The hydrolysis mother liquor, consisting of dilute sulphuric acid containing some ferrous sulphate and titanium (titanyl) sulphate in solution, is passed through line 15 to a concentrator 16 in which it is heated and brought to a sulphuric acid concentration of about 60%. This concentrated acid, which will usually contain some finely dispersed solid ferrous sulphate monohydrate, is then passed through the inlet line 2 to the mixer 1.

The invention is further illustrated in the following examples.

EXAMPLE I

Hydrolysis mother liquor from a hydrolysis unit was fed to a concentrator, on leaving while it had the following composition:

|  | Grams |
|---|---|
| 60% Sulphuric acid | [1] 1,300 |
| Sulphates (solid and dissolved) | 540 |
| Iron | 136 |
| Titanium (reckoned as $TiO_2$) | 16.6 |
| Total weight | 1,840 |

[1] Equivalent to 780.5 g. of 100% of $H_2SO_4$.

7,210 g. of 60% sulphuric acid (fresh and recycled clear acid) is added to this weight of concentrated mother liquor, corresponding to 4,326 g. of 100% $H_2SO_4$, and the whole is then heated to 130° C. and kept at this temperature for 15 minutes while stirring; by this means roughly 260 g. of ferrous sulphate monohydrate (i.e. about 85 g. of iron) is brought into solution. Thereafter 1,110 g. of ground ilmenite containing 28.09%, 312.8 g.) of iron (i.e. 2.3 times the iron contained in the concentrated mother liquor), is introduced all at once. Digestion of the ore starts immediately, and the temperature is raisted to about 150° C., at which the mixture starts to boil. Boiling is continued for 1 hour. The mixture is then cooled to 50° C. and fed into the vacuum filter. There is thus obtained, without difficulty, 3.857 g. of sulphate as residue, and 5,680 g. of a clear acid filtrate.

The acid filtrate, together with a complement of fresh acid, serves for a new, quantitatively identical, operation. The sulphates are dissolved in the water, yielding 4.11 litres of a solution of density 54.5° Be, which is clarified by adding 128 cc. of an 8% gelatine solution.

After 6 hours 87% by volume of a clear solution are obtained, in which the ferric iron is electrolytically reduced to ferrous iron. The solution is then subjected to the normal process for the manufacture of titanium dioxide, in the course of which ferrous sulphate heptahydrate of good quality is first crystallised out by cooling and separated by centrifuging. The titanium dioxide formed by the conventional hydrolysis is separated, and the hydrolysis mother liquor forwarded without further treatment to a concentrator in which it is brought again to a concentration of 60% $H_2SO_4$ as described above and re-used for digesting further ore.

EXAMPLE II

This example illustrates a continuous process employing apparatus as illustrated in the drawing. The hourly feed and output figures are given in the following table:

| Materials | Gross weight, kg. | Net weight, kg. |
|---|---|---|
| Ilmenite fed | 11.4 | |
| Fresh 60% sulphuric acid fed | 15.2 | 9.10, $H_2SO_4$ |
| Concentrated hydrolysis mother liquor recycled | 19.0 | 8.00, $H_2SO_4$ |
| Acid filtrate recycled | 58.3 | 35.00, $H_2SO_4$ |
| Sulphates obtained from the filtration | 40 | |

Only 90% of the acid filtrate is recycled, 10% being continuously withdrawn, so as to avoid an accumulation of elements which are harmful to the whiteness of the titanium dioxide.

The 40 kg./hour of sulphates is treated as described above to remove much of the iron as ferrous sulphate heptahydrate, and most of the titanium as titanium dioxide.

The process of the invention is simple and economical, and allows the whole of the hydrolysis mother liquor to be reemployed without a second concentration stage. Moreover, the process, while using a single concentration stage to 60% sulphuric acid, avoids the principal difficulty previously encountered with such a single stage of concentration, namely the delicate and difficult separation of the solid sulphates produced. This of couse provides the economic advantage that the equipment previously used for this separation can be dispensed with. In addition the invention makes it possible to remove the iron derived from the titanium ore entirely in the form of dry ferrous sulphate heptahydrate which is practically free from acid and can be dumped on slag-heaps, and not in the form of the monohydrate which is difficult to handle and which is impregnated with acid which is difficult to recover. As a result all the acid can be re-used with substantially no loss. Similarly all the titanium remaining in the hydrolysis mother liquor is eventually recovered as titanium dioxide without the use of any separate plant or operation for this purpose. The recovery cycle substantially facilitates the clarification of the solution of the sulphates obtained from the filtration.

I claim:

1. A process for the production of titanium dioxide from a titanium ore by digesting the ore with sulphuric acid and hydrolysing the titanium sulphate so obtained, which comprises (a) feeding a titanium ore and fresh sulphuric acid, together with recycled clear sulphuric acid and recycled concentrated hydrolysis mother liquor obtained as described below, to a digestion step, (b) cooling the solution obtained from the digestion sufficiently to precipitate the sulphates contained in it, (c) separating the precipitate from the clear acid mother liquor, (d) recycling at least part of the said clear mother liquor to the digestion step with the said fresh sulphuric acid, (e) dissolving the precipitate in water, (f) separating iron from the resulting solution as ferrous sulphate heptahydrate, (g) hydrolysing the titanium sulphate in the solution to titanium dioxide, (h) separating the titanium dioxide from the hydrolysis mother liquor, (i) concentrating the hydrolysis mother liquor which still contains residual sulphates, in a single stage and (j) recycling the concentrated hydrolysis mother liquor to the digestion step with the said fresh sulphuric acid, the amount of sulphuric acid employed in the digestion being more than twice the stoichiometric equivalent of the titanium ore.

2. Process according to claim 1, in which the hydrolysis mother liquor is concentrated to a sulphuric acid content of about 60%, a total of 4–6 times its weight of sulphuric acid is added as a 60% solution to the concentrated hydrolysis mother liquor, both being reckoned as 100% $H_2SO_4$, and the amount of titanium ore treated is such that it contains 2–3 parts by weight of iron for each part of iron in the recycled hydrolysis mother liquor.

3. Process according to claim 2, in which 5.5 times its weight of sulphuric acid is added to the hydrolysis mother liquor, and the amount of titanium ore treated is such that it contains 2.3 parts by weight of iron for each part of iron in the recycled mother liquor.

4. Process according to claim 1, in which the digestion is effected at a temperature rising from about 130° C. to the boiling point of the digestion liquor.

5. Process according to claim 1, in which the solution obtained from the digestion is cooled to 60° C. or below to precipitate the sulphates.

6. Process according to claim 1, in which the titanium ore is ilmenite.

7. Process according to claim 1, in which the process is carried out continuously and a fraction of the clear mother liquor from the precipitation step is withdrawn from the system.

8. Process according to claim 7, in which approximately one-tenth of the said mother liquor is withdrawn.

9. Process according to claim 2, in which the digestion is effected at a temperature rising from about 130° C. to the boiling point of the digestion liquor.

10. Process according to claim 2, in which the solution obtained from the digestion is cooled to 60° C. or below to precipitate the sulphates.

11. Process according to claim 2, in which the titanium ore is ilmenite.

12. Process according to claim 2, in which the process is carried out continuously and a fraction of the clear mother liquor from the precipitation step is withdrawn from the system.

13. Process according to claim 12, in which approximately one-tenth of the said mother liquor is withdrawn.

References Cited

UNITED STATES PATENTS

| | | | |
|---|---|---|---|
| 2,298,032 | 10/1942 | Bousquet et al. | 23—202 XR |
| 2,774,650 | 12/1956 | Oppegaard | 23—202 XR |
| 2,849,289 | 8/1958 | Zirngibl et al. | 23—117 |
| 3,091,515 | 5/1963 | Dantro et al. | 23—202 |
| 3,169,046 | 2/1965 | Nespital | 23—202 |
| 3,218,131 | 11/1965 | Grose | 23—202 |
| 3,368,870 | 2/1968 | Soloducha | 23—202 |

EDWARD STERN, Primary Examiner

U.S. Cl. X.R.

23—117, 126

UNITED STATES PATENT OFFICE

CERTIFICATE OF CORRECTION

Patent No. 3,533,742                                   Dated October 13, 1970

Felix Oster

Assignor to Fabriques de Produits Chimiques
de Thann et de Mulhouse, Thann, Haut-Rhin
France It is certified that error appears in the above identified patent and that said Letters Patent are hereby corrected as shown below:

Column 1, line 61, "consistant" should read -- consistent -- .

Column 3, line 56, "emmersion" should read -- immersion -- ; lines 66-67, delete the sentence enclosed in parentheses, i.e. "(Any residue will go into solution during the digestion.)".

Column 4, line 10, "heptaydrate" should read -- heptahydrate -- .

Column 5, line 20, "312.8 g.)" should read -- (312.8 g.) -- ; line 28, "3.857 g." should read -- 3857 g. -- .

Signed and sealed this 23rd day of November 1971.

(SEAL)
Attest:

EDWARD M.FLETCHER,JR.                    ROBERT GOTTSCHALK
Attesting Officer                        Acting Commissioner of Patents